Patented May 29, 1923.

1,456,969

UNITED STATES PATENT OFFICE.

OLIVER W. BROWN AND CLYDE O. HENKE, OF BLOOMINGTON, INDIANA.

PROCESS FOR THE MANUFACTURE OF AROMATIC AMINO COMPOUNDS.

No Drawing.     Application filed June 5, 1922. Serial No. 566,144.

*To all whom it may concern:*

Be it known that we, OLIVER W. BROWN and CLYDE O. HENKE, citizens of the United States, residing at Bloomington, in the county of Monroe and State of Indiana, have invented a new and useful Process for the Manufacture of Aromatic Amino Compounds, of which the following is a specification.

Our invention relates to a process for the manufacture of aromatic amino compounds from aromatic nitro compounds.

It is the object of our invention to produce aromatic amino compounds more rapidly and more inexpensively and at a higher rate and yield than has heretofore been done; and to produce these compounds in a pure state, without reducing the yield by the formation of other compounds, as cyclo compounds, methane, or ammonia, some of which may contaminate the final products.

It is well known that amino compounds are produced by the chemical or eletrolytic reduction of nitro compounds, and that they may also be produced by passing a mixture of hydrogen gas and a volatile nitro compound over certain finely divided metal catalysts, of which nickel, cobalt, copper, iron, platinum, osmium, and iridium have been used. To manufacture amino compounds by the methods commonly used requires the employment of costly reducing agents and apparatus. When amino compounds are prepared by passing a volatilized nitro compound mixed with hydrogen gas over active nickel, the product obtained is impure, because the reactions which occur lead to the formation of cyclo compounds and to the decomposition of the nitro compound into methane and ammonia. When copper, iron, cobalt, or any of the platinum-group metals are employed as the catalyst in the production of an amine by passing a volatile nitro compound mixed with hydrogen over it, the process is relatively slow, making the cost of the apparatus great for a given production.

By our present invention we avoid these objectionable features.

In accordance with our invention, the vapors of an aromatic nitro compound mixed with hydrogen or with a gas containing hydrogen are passed over and in intimate contact with a catalyst consisting of or containing tin or a compound of tin, at a temperature sufficient to produce the desired reaction. Under this treatment, the aromatic nitro compound is rapidly reduced to an aromatic amino compound, in a very pure state, and with a very large yield.

The range of temperature which we find produces this reaction to a practical degree is between 200° C. and 350° C.

To illustrate the practical operation of our process:

When we passed the vapor of nitrobenzene mixed with an excess of hydrogen gas over a catalyst heated to 230° C. and containing finely divided tin and tin oxide (prepared by reducing tin oxide in a current of hydrogen) we obtained a reduction of substantially all the nitrobenzenes, as we obtained a yield of substantially 99% thereof of aniline (amidobenzene).

We have obtained equally good results in the reduction of other nitro compounds to amines.

We prefer to prepare our tin-containing catalyst by heating oxide of tin in hydrogen or in a gas containing hydrogen or other reducing agent, preferably by reducing the tin oxide by heat in a current of the hydrogen or other gas. The tin oxide used may be prepared by precipitation from a soluble tin salt (such as stannous chloride) by sodium carbonate or other suitable alkaline precipitating agent. The tin catalyst, or the tin oxide from which it is made, may be used in a pure condition, or it may be mixed with some other substance which will act as a support, such as pumice stone, asbestos, aluminum oxide, or a finely divided metal which will not alloy with the tin under the conditions encountered in the process.

We have found that the process specifically described above may be varied in many ways, and yet produce good yields of amines. Thus, for instance, it is not necessary to use hydrogen in the pure condition, as the hydrogen may be used either in such pure condition, or may be mixed with water vapor or other gas which is relatively inert under the conditions obtained in our process. The gas mixture may be brought into contact with or forced through the catalyst in any suitable way; and the proportion of the nitro-compound vapor to the hydrogen-containing gas may be varied within wide limits, though it is essential for large yields that there be an excess of hydrogen in order to obtain the reduction of substantially all the original nitro compound.

We claim as our invention:

1. The process of producing aromatic amino compounds, which consists in subjecting an aromatic nitro compound in the gaseous state and mixed with hydrogen-containing gas to the action of a catalyst containing a compound of tin.

2. The process of producing aromatic amino compounds, which consists in subjecting an aromatic nitro compound in the gaseous state and mixed with hydrogen gas to the action of a catalyst containing a compound of tin.

3. The process of producing aromatic amino compounds, which consists in subjecting an aromatic nitro compound in the gaseous state and mixed with hydrogen-containing gas to the action of a catalyst containing tin.

4. The process of producing aromatic amino compounds, which consists in subjecting an aromatic nitro compound in the gaseous state and mixed with hydrogen gas to the action of a catalyst containing tin.

5. The process of producing aromatic amino compounds as set forth in claim 1, with the temperature elevated to between 200° C. and 350° C.

6. The process of producing aromatic amino compounds as set forth in claim 2, with the temperature elevated to between 200° and 350° C.

7. The process of producing aromatic amino compounds as set forth in claim 3, with the temperature elevated to between 200° and 350° C.

8. The process of producing aromatic amino compounds as set forth in claim 4, with the temperature elevated to between 200° and 350° C.

9. The process of producing aniline (amidobenzol), which consists in subjecting nitrobenzene in the gaseous state and mixed with hydrogen-containing gas to the action of a catalyst containing a compound of tin.

10. The process of producing aniline (amidobenzol), which consists in subjecting nitrobenzene in the gaseous state and mixed with hydrogen gas to the action of a catalyst containing a compound of tin.

11. The process of producing aniline (amidobenzol), which consists in subjecting nitrobenzene in the gaseous state and mixed with hydrogen-containing gas to the action of a catalyst containing tin.

12. The process of producing aniline (amidobenzol), which consists in subjecting nitrobenzene in the gaseous state and mixed with hydrogen gas to the action of a catalyst containing tin.

13. The process of producing aniline (amidobenzol) as set forth in claim 9, with the temperature elevated to between 200° C. and 350° C.

14. The process of producing aniline (amidobenzol) as set forth in claim 10, with the temperature elevated to between 200° C. and 350° C.

15. The process of producing aniline (amidobenzol) as set forth in claim 11, with the temperature elevated to between 200° C and 350° C.

16. The process of producing aniline (amidobenzol) as set forth in claim 12, with the temperature elevated between 200° C and 350° C.

In witness whereof, we OLIVER W. BROWN and CLYDE O. HENKE have hereunto set our hands at Bloomington, Indiana, this 31st day of May, A. D. one thousand nine hundred and twenty two.

OLIVER W. BROWN.
CLYDE O. HENKE.